(No Model.)

J. KNOUS.
BEARING FOR VELOCIPEDES.

No. 354,511. Patented Dec. 14, 1886.

WITNESSES.

INVENTOR.
John Knous
By Charles E. Pratt
Atty

UNITED STATES PATENT OFFICE.

JOHN KNOUS, OF HARTFORD, CONNECTICUT, ASSIGNOR TO THE POPE MANUFACTURING COMPANY, OF SAME PLACE.

BEARING FOR VELOCIPEDES.

SPECIFICATION forming part of Letters Patent No. 354,511, dated December 14, 1886.

Application filed September 29, 1886. Serial No. 214,823. (No model.)

*To all whom it may concern:*

Be it known that I, JOHN KNOUS, of the city of Hartford, in the county of Hartford and State of Connecticut, have invented certain new and useful Improvements in Adjusting Devices for Anti-Friction Bearings for Velocipedes and other Vehicles or Purposes, of which the following is a specification.

My improvements relate to that class of bearings in which spherical or other rollers are used, and more particularly to that variety known as "adjustable" or "laterally-adjustable" bearings capable of being adjusted for wear; and the nature of my improvements will be apparent from the following description, taken in connection with the accompanying drawings, in which—

Figure 1:
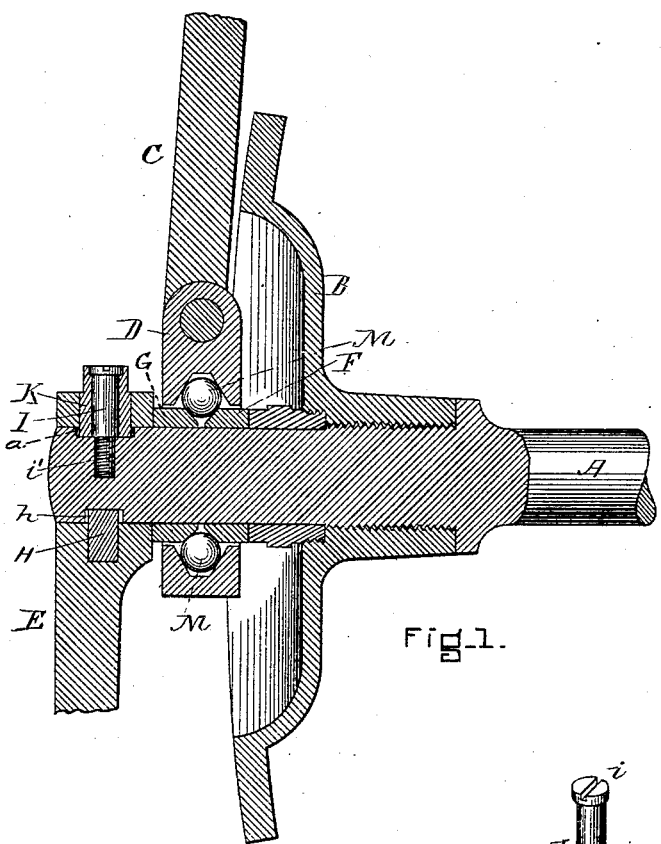
Figure 2:
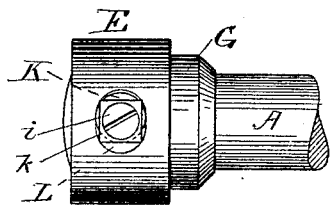
Figure 3:
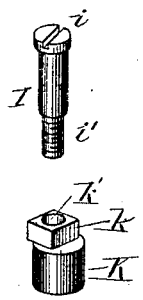

Figure 1 represents in vertical section one end of a bicycle axle, hub, flange, fork, crank, and bearings embodying my improvements in one form; and Figs. 2 and 3 represent in elevation parts thereof, the same letters indicating the same parts in the several figures.

A is an axle. B is a hub-flange. C is a fork end. D is a bearing-box. E is a crank. F is a cone or stationary sleeve on the axle. G is a movable cone or collar on the axle, which, as I prefer to make it, is separate from the crank, but may be integral therewith. H is a crank-key. I is a set-screw, which I construct with slot *i* in the outer end for a screw-driver, and with a threaded part, *i'*, at the inner end, a plain cylindrical part being left between these two parts. K is an eccentric motor piece or cam having on one end a nut-head, *k*, or similar device by which it may be made to revolve by means of a wrench or otherwise upon an axle coincident with the axis of the hole *k'* through the main barrel of the cam and the nut-head. L is a hole or slot in the crank-boss. M M is a circular row of balls or rollers which may be either spherical or of any approved form.

The operation of my improvement is as follows: The parts being assembled substantially as in Fig. 1—that is to say, the cone F placed on the axle A and the box D about it, with the balls M therein, and the movable collar G placed on the axle and caused to impinge against the balls M and cause them to approach the collar F, and the boss of the crank E also placed upon the axle A outside of the movable collar G and against it, the eccentric motor-piece being placed with its main barrel in the slot L of the crank-boss E and resting on the flattened part *a* of the axle A, but with its thinner side toward the collar G, and the set-screw I being inserted in the hole *k'* of the eccentric motor K, with its threaded part *i'* screwed into the axle A loosely—then, by means of a wrench upon the nut-head *k* or otherwise, the eccentric K is made to revolve, presenting thicker and thicker part toward the movable collar G until the crank is moved up and the collar G set toward the collar F until a suitable adjustment of the bearing is made. Then, by means of a screw-driver in the slot *i*, the set-screw I is screwed home to hold the eccentric firmly in its place, and the crank-key H is inserted and driven home and secured. By this means the bearing is suitably adjusted and held in adjustment, and the crank is secured to the axle and held in position. To vary the adjustment of the bearing, either to loosen it or to tighten it to take up for wear, the key H is first loosened. The set-screw I is next loosened, and the eccentric K is moved one way or the other, so as to present its thicker or thinner part toward the movable cone G, thus varying the position of the cone and crank-boss on the axle A.

It is obvious that this construction may be modified for adaptation to other bearings or other positions in velocipedes, that instead of a crank-boss a plain collar or ring may be used, that the cones G and F may be either separate from or connected with other parts, and that other modifications in form or arrangement may be made without departing from the substance of my invention; and I do not mean to limit myself strictly to the form and arrangement of the devices shown.

I claim as new and of my invention—

1. The combination, with a movable adjusting cone or collar in an anti-friction bearing and the axle on which it presses, of an eccentric motor-piece and a set-screw, constructed to operate substantially as set forth.

2. The combination of an axle, as A, bearing-box, as D, balls, as N, stationary cone, as F, movable cone, as G, crank-boss or roller E, key, as H, and an eccentric motor piece or cam, as K, and set-screw, as I, constructed to operate essentially as set forth.

JOHN KNOUS.

Witnesses:
A. J. WELLES,
E. S. HOUSE.